United States Patent
Kim et al.

(10) Patent No.: US 10,589,648 B2
(45) Date of Patent: Mar. 17, 2020

(54) APPARATUS FOR OPENING AND CLOSING SLIDING ARMREST CONSOLE

(71) Applicants: Hyundai Motor Company, Seoul (KR); Kia Motors Corporation, Seoul (KR); DAEJOO PRECISION INDUSTRIAL CO., LTD., Hwaseong-si (KR)

(72) Inventors: Hye Kyung Kim, Suwon-si (KR); Sung Sik Choi, Suwon-si (KR); Young Ju Lee, Suwon-si (KR); Keun Sig Lim, Yongin-si (KR); Dae Ig Jung, Suwon-si (KR); Keun Hong Bae, Suwon-si (KR); Ki Young An, Sacheon-si (KR)

(73) Assignees: Hyundai Motor Company, Seoul (KR); Kia Motors Corporation, Seoul (KR); Daejoo Precision Industrial Co., Ltd., Hwaseong-si (KR)

( * ) Notice: Subject to any disclaimer, the term of this patent is extended or adjusted under 35 U.S.C. 154(b) by 101 days.

(21) Appl. No.: 15/838,013

(22) Filed: Dec. 11, 2017

(65) Prior Publication Data
US 2018/0236917 A1   Aug. 23, 2018

(30) Foreign Application Priority Data
Feb. 20, 2017   (KR) .......................... 10-2017-0022356

(51) Int. Cl.
*B60N 2/75*   (2018.01)
*B60R 7/04*   (2006.01)

(52) U.S. Cl.
CPC ............. *B60N 2/793* (2018.02); *B60N 2/753* (2018.02); *B60N 2/78* (2018.02); *B60R 7/04* (2013.01)

(58) Field of Classification Search
CPC ............ B60N 2/793; B60N 2/753; B60R 7/04
(Continued)

(56) References Cited

U.S. PATENT DOCUMENTS 5,505,516 A * 4/1996 Spykerman ............ B60N 3/102
                                                      248/311.2
7,770,953 B2 * 8/2010 Koarai ..................... B60R 7/04
                                                      296/24.34
(Continued)

FOREIGN PATENT DOCUMENTS

JP   2016-097690 A   5/2016
KR   10-0805476 B1   2/2008
(Continued)

*Primary Examiner* — Joseph D. Pape
*Assistant Examiner* — Dana D Ivey
(74) *Attorney, Agent, or Firm* — Morgan, Lewis & Bockius LLP

(57) ABSTRACT

An apparatus for opening and closing a sliding armrest console, in which it is easy to access a console storage space by inserting an armrest into an armrest console in a state in which the console is opened, may include an armrest rotating about a main hinge, a console, an upper portion of which is closed by the armrest, a first guide groove formed for guiding a movement direction of an auxiliary hinge positioned at the armrest when the armrest rotates, and a main guide groove formed in a vertical direction of the console such that the main hinge moves along the main guide groove, wherein when the main hinge moves along the main guide groove, the auxiliary hinge moves along a second guide groove, which is vertically connected to the first guide groove, so that the armrest is inserted into the console.

12 Claims, 11 Drawing Sheets

(58) Field of Classification Search
USPC .................................................... 296/24.34
See application file for complete search history.

(56) References Cited

U.S. PATENT DOCUMENTS

2009/0066103 A1    3/2009  Koarai
2017/0267183 A1*  9/2017  Catlin ...................... B60R 7/04

FOREIGN PATENT DOCUMENTS

| KR | 10-1063708 B1 | 9/2011 |
|----|----|----|
| KR | 10-2015-0098177 A | 8/2015 |

* cited by examiner

APPARATUS FOR OPENING AND CLOSING SLIDING ARMREST CONSOLE

CROSS-REFERENCE TO RELATED APPLICATION

The present application claims priority to Korean Patent Application No. 10-2017-0022356 filed on Feb. 20, 2017, the entire contents of which is incorporated herein for all purposes by this reference.

BACKGROUND OF THE INVENTION

Field of the Invention

The present invention relates to an apparatus for opening or closing a sliding armrest console. More particularly, the present invention relates to an apparatus for opening or closing a sliding armrest console, in which it is easy to access an armrest console which is open by rotating an armrest such that the armrest is opened and then inserted into the console and the height of the armrest is lowered in a state in which the console is open.

Description of Related Art

In general, a console box is disposed between a driver seat and a passenger seat of a vehicle to temporarily store articles, and an armrest is disposed on the console box to serve as a lid and simultaneously enable the occupants accommodated on the seats of the vehicle to comfortably put their arms thereon.

The armrest is important in reducing driver fatigue since it is provided to shift gears in the state in which a driver puts his or her arm on the armrest when driving long distance.

As the armrest, there are a simple armrest which is formed with a center console therein to cover only a portion of a shift lever or a parking brake lever, which is disposed to the tunnel of a floor panel between a driver seat and a passenger seat, and a large armrest that forms a portion of an instrument panel to dispose a switch, a radio, a stereo, a heater control, a small article pocket, etc. thereon and which is provided with a box having a padded lid in the rear thereof while an ashtray or a switch for rear seats is disposed to the box.

There is provided an open-type armrest to use a console for various purposes in recent years, and a study is ongoing to utilize the console space within the opened armrest as a load space.

FIG. 1 illustrates a lateral opening type center console, wherein armrests 10 are opened right and left through fixed hinges 12.

As illustrated in the drawing, the armrests 10 are connected to the console through the fixed hinges 12 that are positioned right and left, and a console storage space is open by the rotation of the armrests 10.

When the fixed hinges 12 of the armrests 10 are positioned above the console storage space, it is difficult to access the storage space since the armrests 10 are opened too high. On the other hand, when the fixed hinges of the armrests 10 are positioned under the console storage space, there is an insufficient space for the rotation of the armrests 10 although it is easy to access the storage space when the armrests 10 are opened. Furthermore, the armrests 10 interfere with a console external wall 11 when the armrests 10 rotate.

Furthermore, since the height of the console is restricted to maintain an upper space for the rotation of the armrests, there is a limit in enlarging the storage space.

BRIEF SUMMARY

Various aspects of the present invention are directed to providing an armrest console structure in which it is easy to access a console internal space through a plurality of guide grooves in a state in which a console is open.

Various aspects of the present invention are directed to providing an apparatus for opening or closing a sliding armrest console, in which it is easy to access a console storage space by inserting an armrest into a console in a state in which the armrest is opened.

Various aspects of the present invention are directed to providing an apparatus for opening or closing a sliding armrest console, which may include a closure member for allowing an inserted armrest to move upward by a closure button, easily opening or closing the armrest.

Additional advantages and features of the invention will be set forth in part in the description which follows and in part will become apparent to those having ordinary skill in the art upon examination of the following or may be learned from practice of the invention. The advantages of the invention may be realized and attained by the structure particularly pointed out in the written description and claims hereof as well as the accompanying drawings.

The above can be accomplished by the provision of an apparatus for opening or closing a sliding armrest console.

In an exemplary embodiment of the present invention, an apparatus for opening or closing a sliding armrest console may include an armrest rotating about a main hinge to be opened, a console, an upper portion of which is closed by the armrest, a first guide groove formed for guiding a movement direction of an auxiliary hinge positioned at the armrest when the armrest rotates, and a main guide groove formed in a vertical direction of the console such that the main hinge moves along the main guide groove, wherein when the main hinge moves along the main guide groove, the auxiliary hinge moves along a second guide groove, which is vertically connected to the first guide groove, so that the armrest is inserted into the console.

The apparatus may further include a shock absorption portion configured to regulate an insertion speed of the armrest when the armrest is inserted into and move downwardly in the console.

The shock absorption portion may include a guide rail connected to one end portion of the inserted armrest, and a damper positioned in contact with the guide rail, and when the armrest is inserted into the console along the guide rail, the insertion speed of the armrest may be regulated by the damper.

The apparatus may further include a closure member positioned in contact with one end portion of the inserted armrest when the armrest is opened and inserted into the console.

The closure member may include a closure button positioned at an upper end portion of the console, a closure rod moving to compress a spring member thereof when the armrest is inserted into the console, and a plurality of transmission rods configured to transmit a force applied to the closure button to the closure rod.

The closure member may include closure members positioned at both longitudinal end portions of the console, and the closure members may be interlocked with each other by a rotation rod connected thereto.

The armrest may include an upper armrest and a lower armrest, and the upper armrest may be enlarged longitudinally through the main hinge and an auxiliary sliding rail positioned at the lower armrest.

The main guide groove and the second guide groove may allow the armrest to be inserted into the console in an opened state.

The main guide groove and the first and second guide grooves may be formed over both longitudinal end portions of the console.

The main guide groove and the first and second guide grooves may be formed in a guide cover internally disposed within the console.

The apparatus may further include an elastic member positioned at the main hinge, and the elastic member may be contracted when the armrest rotates.

The armrest may include double armrests.

Other aspects and exemplary embodiments of the invention are discussed infra.

It is understood that the term "vehicle" or "vehicular" or other similar term as used herein is inclusive of motor vehicles in general including passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the invention are discussed infra.

Figure 1:
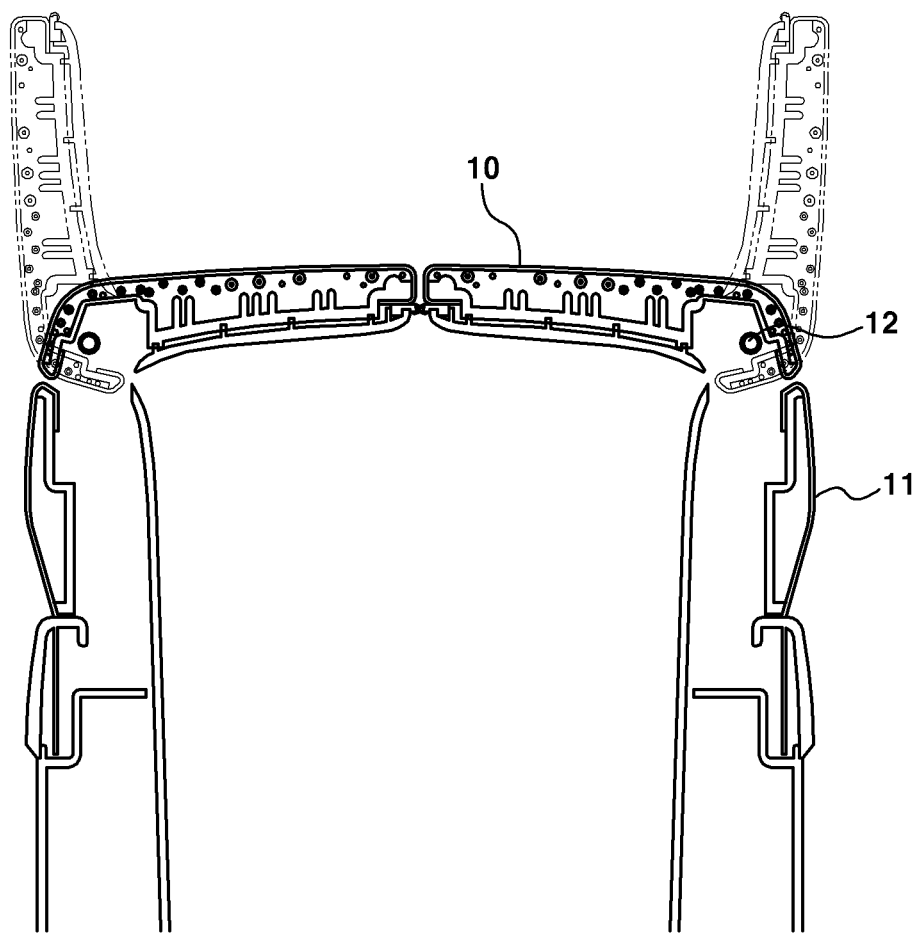
FIG. 1 is a cross-sectional view illustrating an armrest console which is open by rotating armrests in both directions according to the related art.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in portion by the particularly intended application and use environment.

In the figures, reference numbers refer to the same or equivalent parts of the present invention throughout the several figures of the drawing.

DETAILED DESCRIPTION

Reference will now be made more specifically to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

The terms such as "part" used in the specification of the present invention refer to devices that process at least one function or operation, and these may be implemented by hardware, software, or a combination thereof.

Furthermore, the terms including expressions, such as first and/or second, used in the specification of the present invention may be used to describe various elements of the present invention. However, the elements of the present invention should not be limited by the terms used in the specification of the present invention. In other words, such terms will be used only to differentiate one element from other elements of the present invention.

Figure 2:
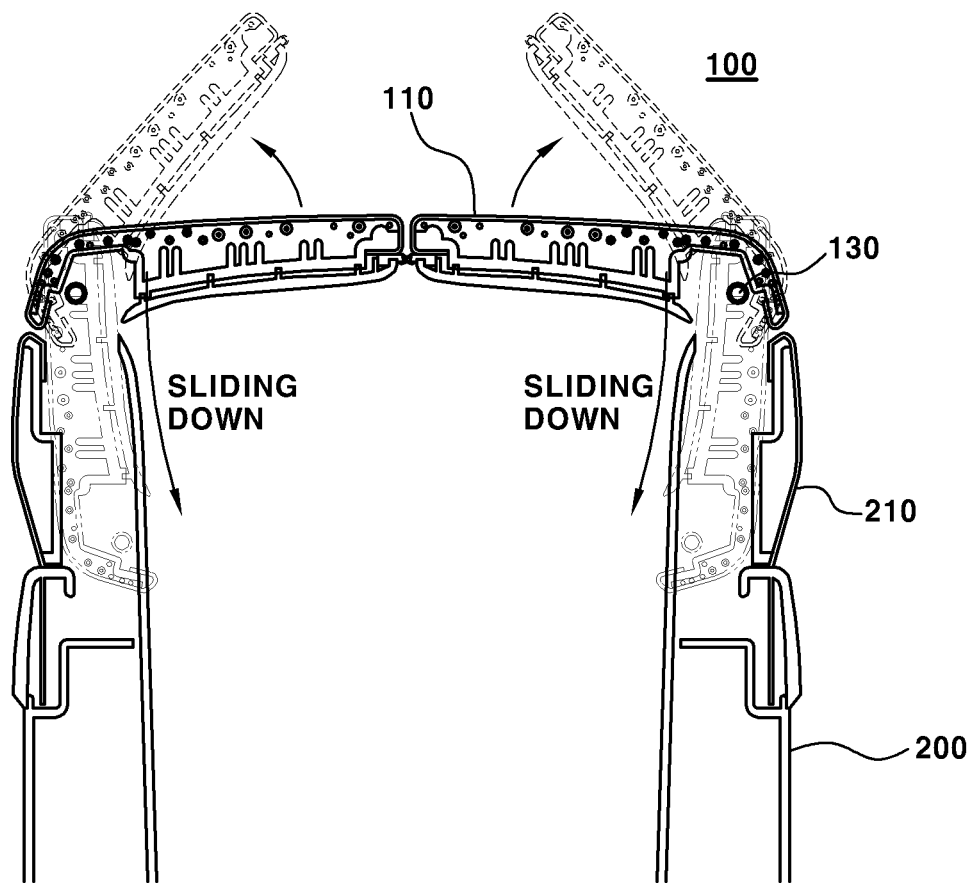
FIG. 2 is a front cross-sectional view illustrating an apparatus for opening or closing a sliding armrest console according to an exemplary embodiment of the present invention.

FIG. 2 is a front cross-sectional view illustrating an apparatus for opening or closing a sliding armrest console 100 including double armrests 110 according to an exemplary embodiment of the present invention. Hereinafter, the exemplary embodiment of the present invention will be described with respect to one of the double armrests 110.

As illustrated in the drawing, the apparatus for opening or closing a sliding armrest console 100 may include a console 200 which is provided in the internal space of a vehicle, and an armrest 110 which is disposed at the upper end portion of the console 200 to close the storage space within the console 200.

Furthermore, the apparatus may include a main hinge 130 which is positioned at the armrest 110 so that the console 200 is open by rotating and opening the armrest 110 about the main hinge 130, and an armrest lever 113 which is fixed to at least one of both longitudinal end portions of the armrest 110.

However, the armrest lever 113 is a portion of the armrest 110 and is a sub-component that defines the portion of the armrest 110 inserted into the console 200.

Accordingly, the armrest 110 may be used in combination with the armrest lever 113, and they may be therefore determined to be the same component.

Furthermore, the apparatus may include an auxiliary hinge 140 which is positioned at the armrest 110. The auxiliary hinge 140 is positioned in the console 200 when the armrest 110 is opened, and allows one end portion of the armrest 110 to be inserted into the console 200.

Furthermore, the apparatus may include a first guide groove 160 for guiding the movement of the auxiliary hinge 140 when the armrest 110 rotates about the main hinge 130, and a main guide groove 150 and a second guide groove 170 for guiding the respective main and auxiliary hinges 130 and 140 such that the armrest 110 is inserted into the console 200 in an opened state.

That is, the apparatus may include the main guide groove 150 through which the main hinge 130 moves downwardly into the console 200 after rotating, and the second guide groove 170 through which the auxiliary hinge 140 moves downwardly in response to the movement of the main hinge 130.

The main guide groove 150 and the second guide groove 170 may guide the main hinge 130 and the auxiliary hinge 140 such that the armrest 110 is inserted into the console 200 in a state in which it is horizontal to an external wall 210 of the console 200.

The guide grooves 150, 160, and 170 are formed in the console 200 to come into contact with both longitudinal end portions of the armrest 110. The guide grooves 150, 160, and 170 are positioned in a guide cover 220 within the console 200, and the guide cover 220 is formed over both longitudinal end portions of the console 200 to be fastened to the main hinge 130 and the auxiliary hinge 140 positioned at both end portions of the armrest 110.

Furthermore, an elastic member 131 is disposed in at least a portion of the main hinge 130. The elastic member 131 positioned at the main hinge 130 is contracted when the armrest 110 rotates. Accordingly, the opened armrest 110 is rotated by the elastic force of the elastic member 131 to be closed.

Figure 3:
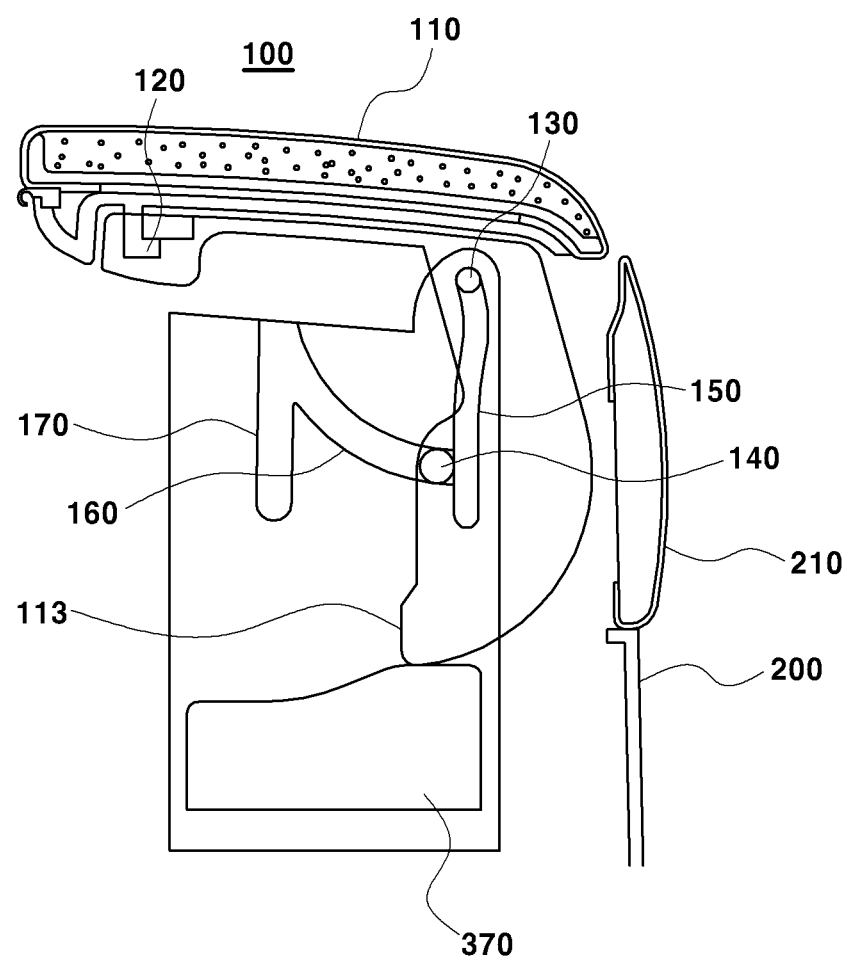
FIG. 3 is a side cross-sectional view illustrating the apparatus for opening or closing a sliding armrest console according to the exemplary embodiment of the present invention.

FIG. 3 is a side cross-sectional view illustrating the apparatus for opening or closing a sliding armrest console 100 including double armrests 110 according to the exemplary embodiment of the present invention. Hereinafter, the exemplary embodiment of the present invention will be described with respect to one of the double armrests 110.

As illustrated in the drawing, the apparatus may include the armrest 110 to cover the console 200, and the armrest 110 is inserted into the console 200.

The armrest 110 rotates about the main hinge 130 positioned inside the width end portion thereof so that the console 200 is open. The main hinge 130 is disposed in the main guide groove 150 and guides the vertical movement of the armrest 110 when the armrest 110 is opened.

The armrest 110 inserted into the console 200 is provided with the auxiliary hinge 140, and the auxiliary hinge 140 moves along the first and second guide grooves 170.

Furthermore, the end portions of the armrest 110 inserted into the console 200 comes into contact with closure rods 370, and the closure rods 370 move downward according to the opening of the armrest 110.

Each of the closure rods 370 may include a spring member 380, and the spring member 380 is compressed when the armrest 110 is opened and moves downward. That is, the spring member 380 may be configured to provide an elastic force for upwardly moving the associated closure rod 370 to return the armrest 110 to the closed state.

Furthermore, the external wall 210 of the console 200 moves widthwise outwardly from the armrest 110 when the armrest 110 is opened, so as not to interfere with a radius of rotation of the armrest 110.

Figure 4A:
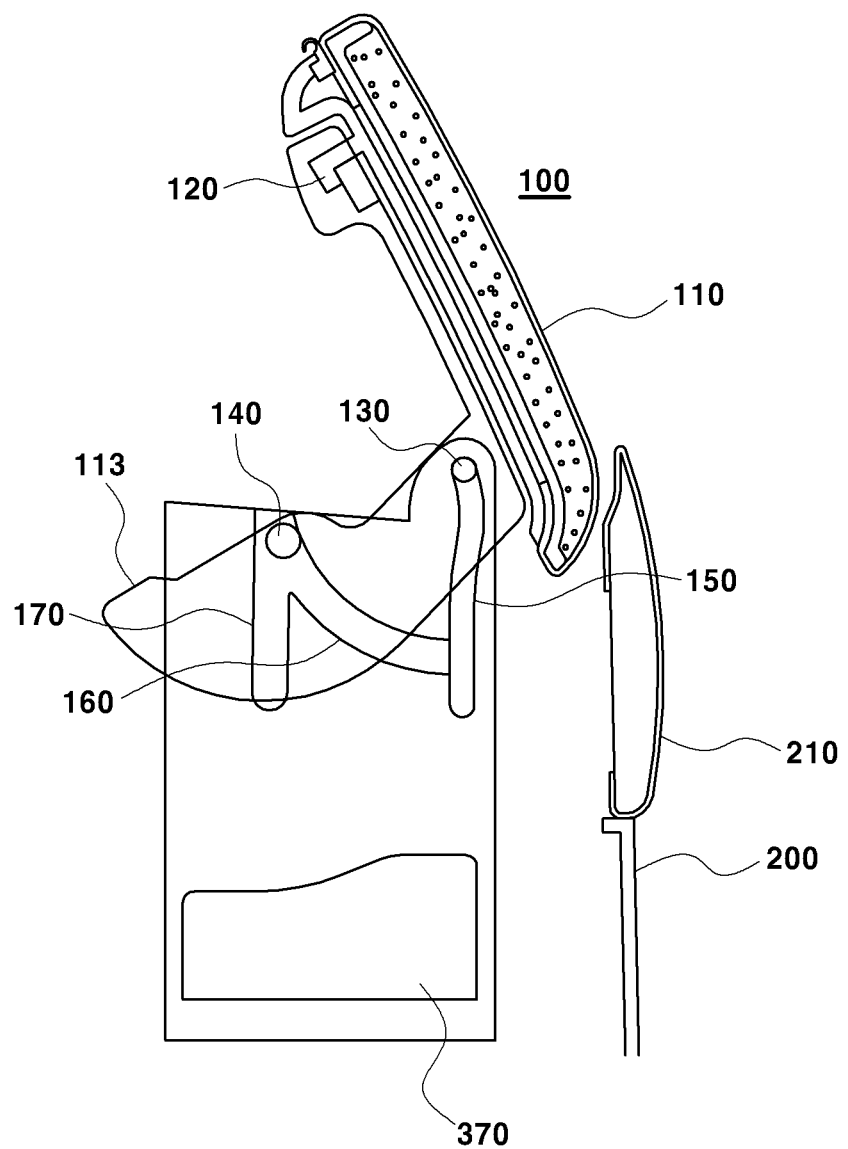
FIG. 4A is a view illustrating a state in which one armrest begins to be opened in the apparatus for opening or closing a sliding armrest console according to the exemplary embodiment of the present invention.

FIG. 4A is a side cross-sectional view illustrating that the console is open in the apparatus for opening or closing a sliding armrest console 100 including double armrests 110 according to the exemplary embodiment of the present invention. Hereinafter, the exemplary embodiment of the present invention will be described with respect to one of the double armrests 110.

The armrest 110 positioned at the upper end portion of the console 200 rotates about the main hinge 130 so that the console 200 is open.

Furthermore, the auxiliary hinge 140, which is inserted into the console 200 and is positioned at the armrest lever 113 in the closed state of the armrest 110, moves along the first guide groove 160 formed in the console 200 when the armrest 110 rotates.

That is, the armrest 110 initially rotates outward of the console 200 about the main hinge 130 to be opened, and the auxiliary hinge 140 within the console 200 moves on the first guide groove 160 along with the rotation of the armrest 110.

Figure 4B:
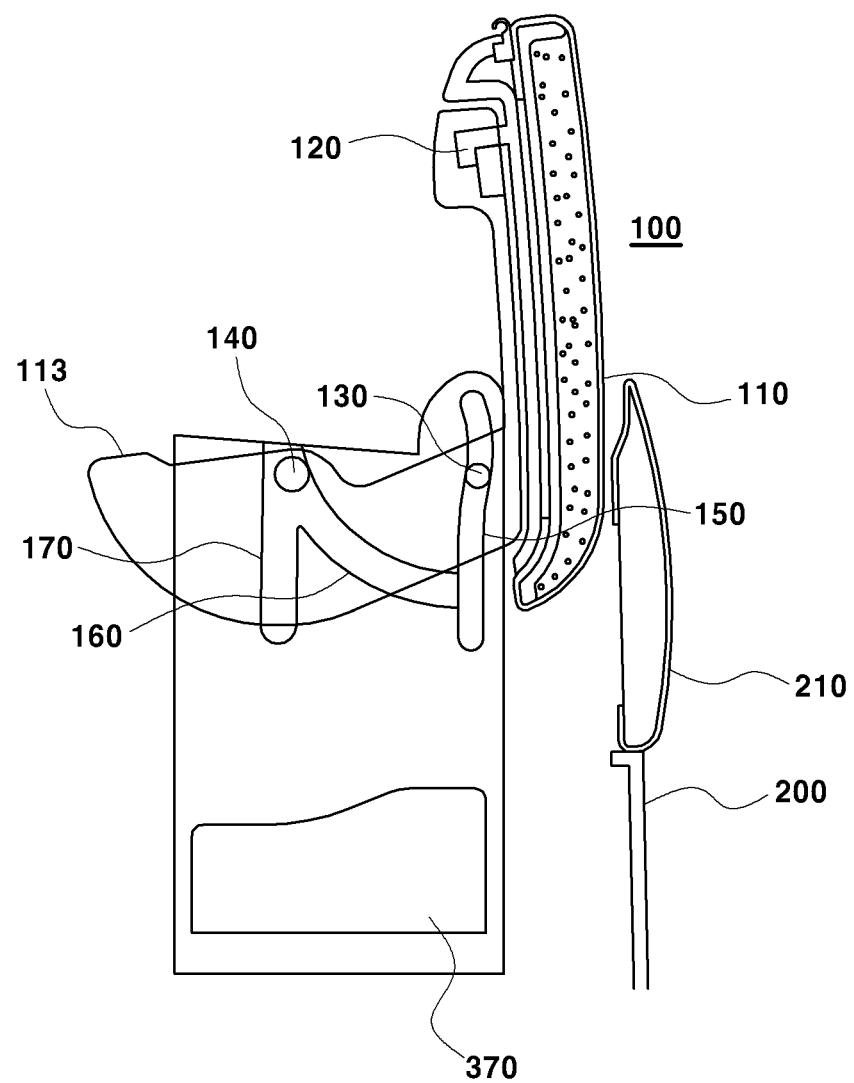
FIG. 4B is a view illustrating a state in which the armrest has been rotated and opened in the apparatus for opening or closing a sliding armrest console according to the exemplary embodiment of the present invention.

FIG. 4B illustrates that the main hinge 130 moves downward after the armrest 110 rotates.

As illustrated in the drawing, after the armrest 110 rotates about the main hinge 130, the auxiliary hinge 140 is positioned at the end portion of the first guide groove 160. The auxiliary hinge 140 may be positioned at an end portion in which the first guide groove 160 comes into contact with the second guide groove 170.

When the auxiliary hinge 140 is positioned at the end portion of the first guide groove 160, the armrest 110 further rotates about the auxiliary hinge 140 in the same direction as the above direction of rotation. Thus, the main hinge 130 is flush with the auxiliary hinge 140.

That is, in the exemplary embodiment of the present invention, the armrest 110 rotates about the main hinge 130 and then rotates about the auxiliary hinge 140 such that the armrest 110 is horizontal to the external wall 210 of the console 200. This is to prevent the external wall 210 of the console 200 from interfering with a radius of rotation of the armrest 110 when the armrest 110 rotates about the auxiliary hinge 140.

That is, when the armrest 110 further rotates about the main hinge 130, the armrest 110 may interfere with the external wall 210 of the console 200. Therefore, after the armrest 110 rotates about the main hinge 130 at a predetermined angle, the armrest 110 further rotates about the auxiliary hinge 140, to prevent the external wall 210 of the console 200 from interfering with a radius of rotation of the armrest 110 and to allow the armrest 110 to be horizontal to the external wall 210 of the console 200.

Alternatively, as illustrated in FIG. 4A, when the armrest 110 rotates about the main hinge 130, the auxiliary hinge 140 may be configured to be flush with the main hinge 130 such that the armrest 110 does not further rotate about the auxiliary hinge 140.

In the exemplary embodiment of the present invention, the further rotation of the armrest 110 about the auxiliary hinge 140 may be selectively performed such that the external wall 210 of the console 200 is horizontal to the armrest 110.

Figure 4C:
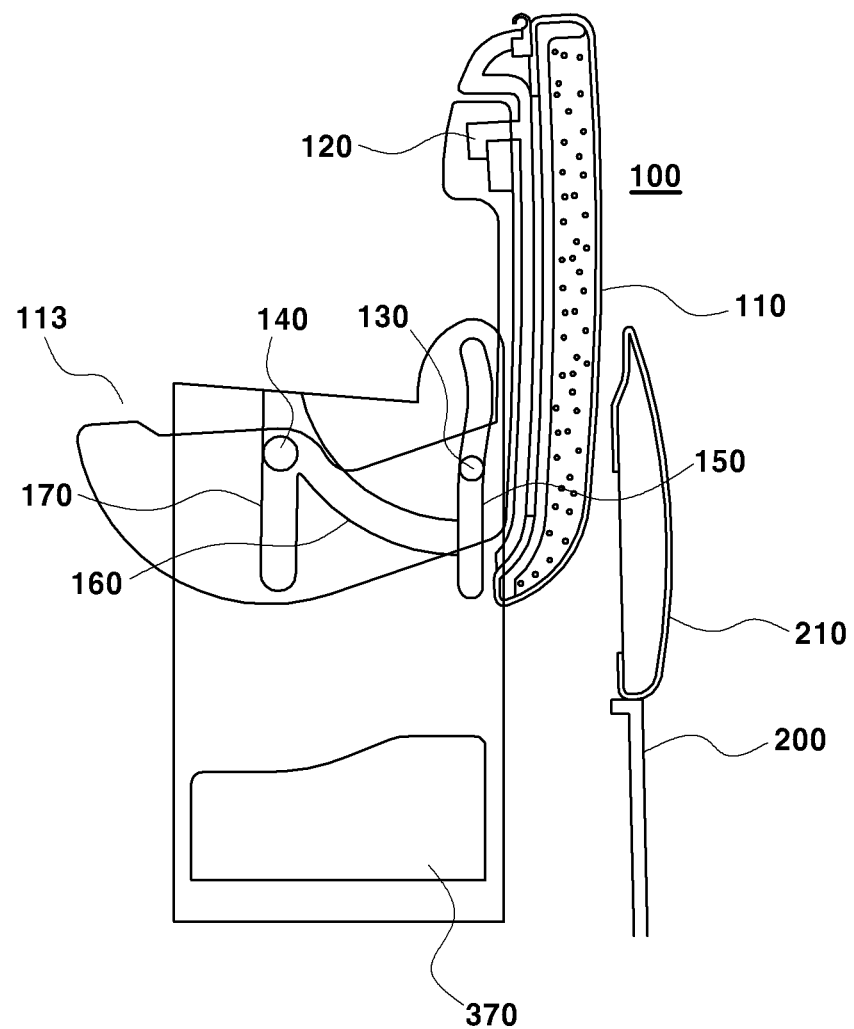
FIG. 4C is a view illustrating a state in which the armrest moves downwardly in the apparatus for opening or closing a sliding armrest console according to the exemplary embodiment of the present invention.

FIG. 4C illustrates that the armrest 110 is inserted into the console 200 in a state in which it is horizontal to the external wall 210 of the console 200.

In FIG. 4C, in the state in which the armrest 110 is horizontal to the external wall 210 of the console 200, the main hinge 130 moves downward along the main guide groove 150 and the auxiliary hinge 140 moved downward along the second guide groove 170 connected to the first guide groove 160.

Since the main and auxiliary hinges 130 and 140 move downward of the console 200 along the main guide groove 150 and the second guide groove 170, respectively, the armrest 110 is inserted into the console 200 in the opened state.

Preferably, since the main guide groove 150 and the second guide groove 170 have the same height, the armrest 110 may be inserted into the console 200 in the state in which it is horizontal to the external wall 210 of the console 200.

Figure 4D:
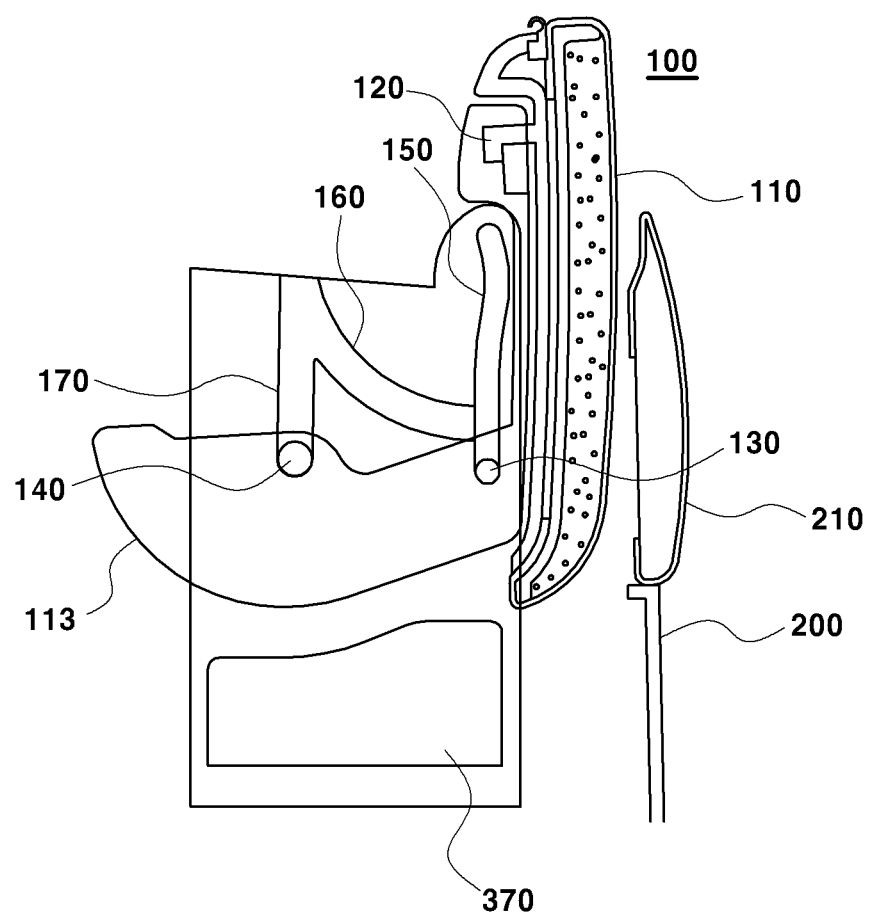
FIG. 4D is a view illustrating a state in which the armrest has been opened in the apparatus for opening or closing a sliding armrest console according to the exemplary embodiment of the present invention.

FIG. 4D illustrates that the armrest 110 is inserted into the console 200 in the opened state of the console 200.

As illustrated in the drawing, the main hinge 130 and the auxiliary hinge 140 move downward of the console 200, and they preferably move downward at the same distance.

Accordingly, when the auxiliary hinge 140 is positioned at the end portion of the second guide groove 170, the main hinge 130 is positioned at the end portion of the main guide groove 150 and the armrest 110 is maintained in the state in which it is horizontal to the external wall 210 of the console 200.

When the auxiliary hinge 140 and the main hinge 130 are respectively positioned at the down end portions of the second guide groove 170 and the main guide groove 150, at least a portion of the armrest 110 is inserted into the console 200 in the state in which the armrest 110 is horizontal to the external wall 210 of the console 200.

Figure 5:
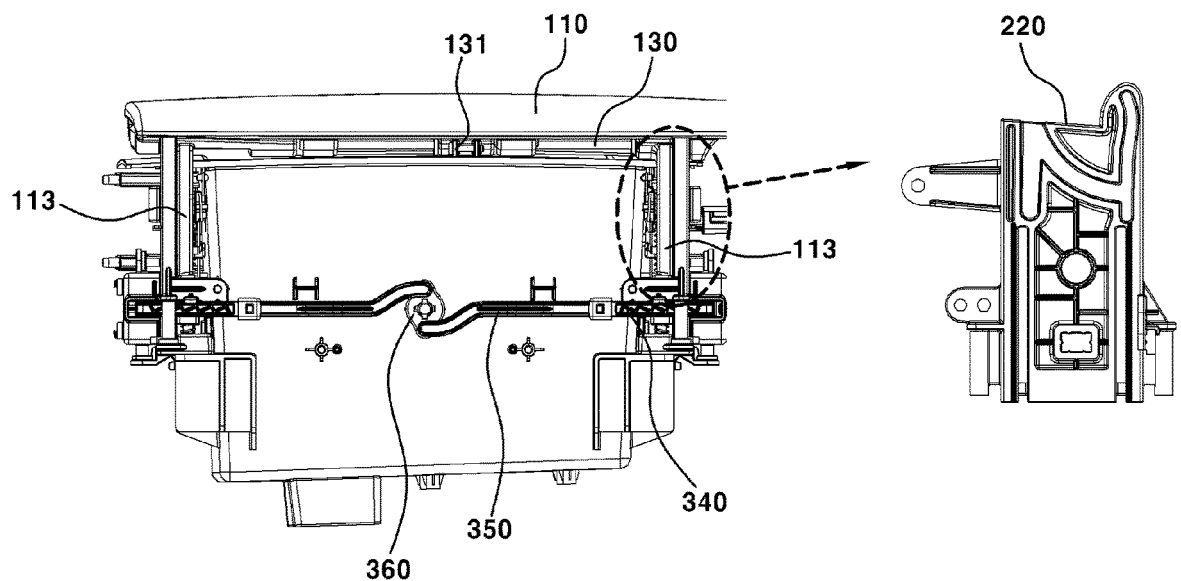
FIG. 5 is a view illustrating a coupling relationship of a guide cover positioned over both end portions in the apparatus for opening or closing a sliding armrest console according to the exemplary embodiment of the present invention.

FIG. 5 illustrates the coupling relationship of the guide cover 220 including the first and second guide grooves 160 and 170 and the main guide groove 150 according to the exemplary embodiment of the present invention.

As illustrated in FIG. 3, the first and second guide grooves 160 and 170 are formed to correspond to the auxiliary hinge 140, and the main guide groove 150 is formed to correspond to the main hinge 130. Therefore, the guide grooves 150, 160, and 170 are components for guiding the movement of the auxiliary and main hinges 140 and 130.

Furthermore, since the guide grooves are positioned inside the console 200, they may be formed in both longitudinal sides of the console 200 to correspond to the auxiliary and main hinges 140 and 130.

Furthermore, the first and second guide grooves 160 and 170 and the main guide groove 150 are formed inside both longitudinal end portions of the console 200, and come into contact with the auxiliary and main hinges 140 and 130 positioned at the armrest 110.

Furthermore, the apparatus may include the guide cover 220 formed inside the console 200 in the longitudinal direction thereof. The guide cover 220 may come into contact with the end portion of the armrest 110 and be fixed to the console 200.

The guide cover 220 may be formed to correspond to both longitudinal end portions of the armrest 110. Therefore, the guide cover 220 may include the first and second guide grooves 160 and 170 and the main guide groove 150 in the internal longitudinal surface of the console 200.

Figure 6:
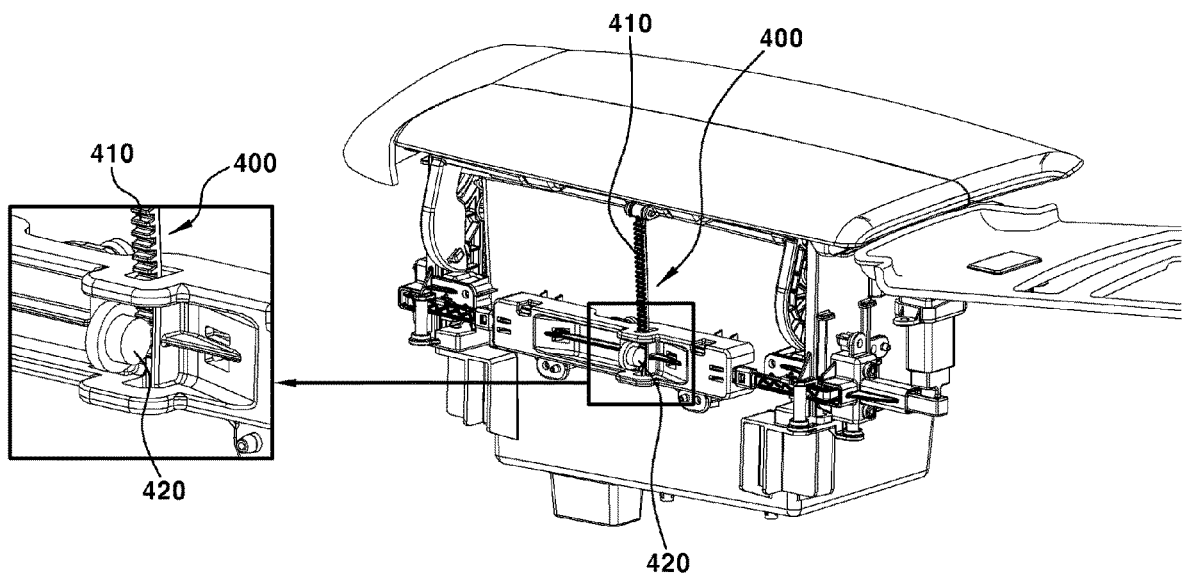
FIG. 6 is a view illustrating a shock absorption portion of the apparatus for opening or closing a sliding armrest console according to the exemplary embodiment of the present invention.

FIG. 6 illustrates a shock absorption portion 400 that regulates the movement speed of the armrest 110 in the height direction thereof when the armrest 110 is opened and inserted into the console 200.

As illustrated in the drawing, the apparatus may include at least one shock absorption portion 400 connected to the armrest 110, and the shock absorption portion 400 regulates the movement speed of the armrest 110 in the height direction thereof when the armrest 110 is inserted into the console 200.

Furthermore, the shock absorption portion 400 may include a guide rail 410 which is connected to the end portion of the armrest 110, and a damper 420 which is in contact with the guide rail 410 and reduces the movement speed of the armrest 110 in the height direction thereof.

The guide rail 410 is formed in the height direction of the console 200, and has a plurality of grooves. The movement speed of the armrest 110 may be reduced such that the grooves formed on the guide rail 410 pass the damper 420 fixed to the console 200.

The grooves of the guide rail 410 are formed at regular distances so that the armrest 110 moves downward at a constant speed through the damper 420 positioned at the console 200.

Accordingly, when the armrest 110 is inserted into the console 200 in the state in which it is horizontal to the external wall 210 of the console 200, the movement speed of the armrest 110 in the height direction thereof may be regulated by the guide rail 410 and the damper 420.

The guide rail 410 is connected to one end portion of the armrest 110 by a hinge to have a degree of freedom. Therefore, the guide rail 410 may be positioned in the height direction of the console 200 even when the armrest 110 is in a closed state and moves in a state in which it is horizontal to the external wall 210 of the console 200.

Thus, it is possible to prevent the armrest 110 from rapidly moving downward when the armrest 110 is opened and inserted into the console 200, by the guide rail, which is connected to one end portion of the armrest 110 and is formed in the longitudinal direction of the console, and the damper 420 which is in contact with the guide rail 410.

Figure 7:
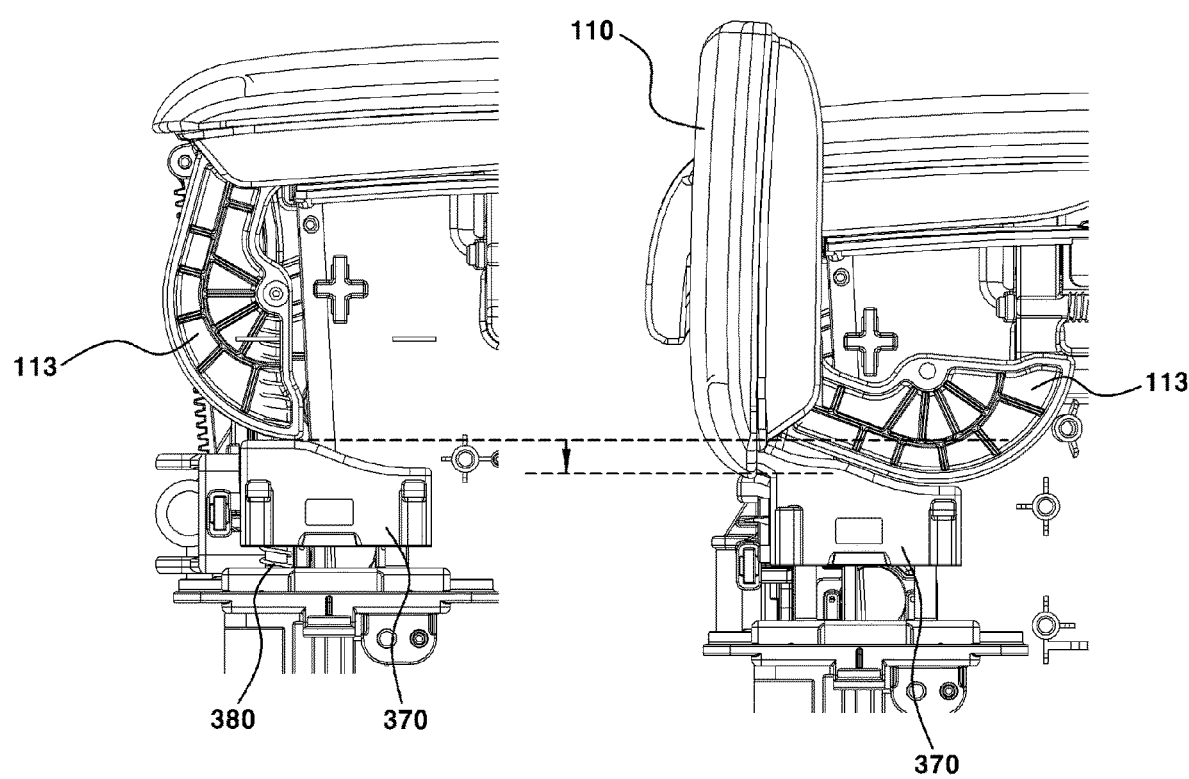
FIG. 7 is a view illustrating a closure member of the apparatus for opening or closing a sliding armrest console according to the exemplary embodiment of the present invention.

FIG. 7 illustrates that the closure rods 370 move downward according to the insertion of the armrest 110 into the console 200 according to the exemplary embodiment of the present invention.

As illustrated in the drawing, the closure rods 370 come into the contact with the armrest 110 inserted into the console 200. The closure rods 370 move downward when the main hinge 130 and the auxiliary hinge 140 move downward along the main guide groove 150 and the second guide groove 170, respectively.

That is, the closure rods 370 coming into contact with the end portion of the armrest 110 moves in the same direction along with the movement of the armrest 110, in which case the spring members 380 positioned at the lower end portions of the closure rods 370 are compressed.

The closure rods 370 are formed at respective longitudinal end portions of the console 200, and thus both end portions of the armrest 110 may come into contact with the respective closure rods 370.

Since the spring members 380 positioned at the lower end portions of the closure rods 370 are compressed in the opened state of the armrest 110, the armrest 110 inserted into the console 200 moves upward by a closure button 310 disposed in the console 200.

Furthermore, the apparatus may include a plurality of transmission rods 320, 330, 340, and 350 to transmit the force applied to the closure button 310 to the closure rods 370, and the closure rods 370 are interlocked with each other by a rotation rod 360.

Figure 8:
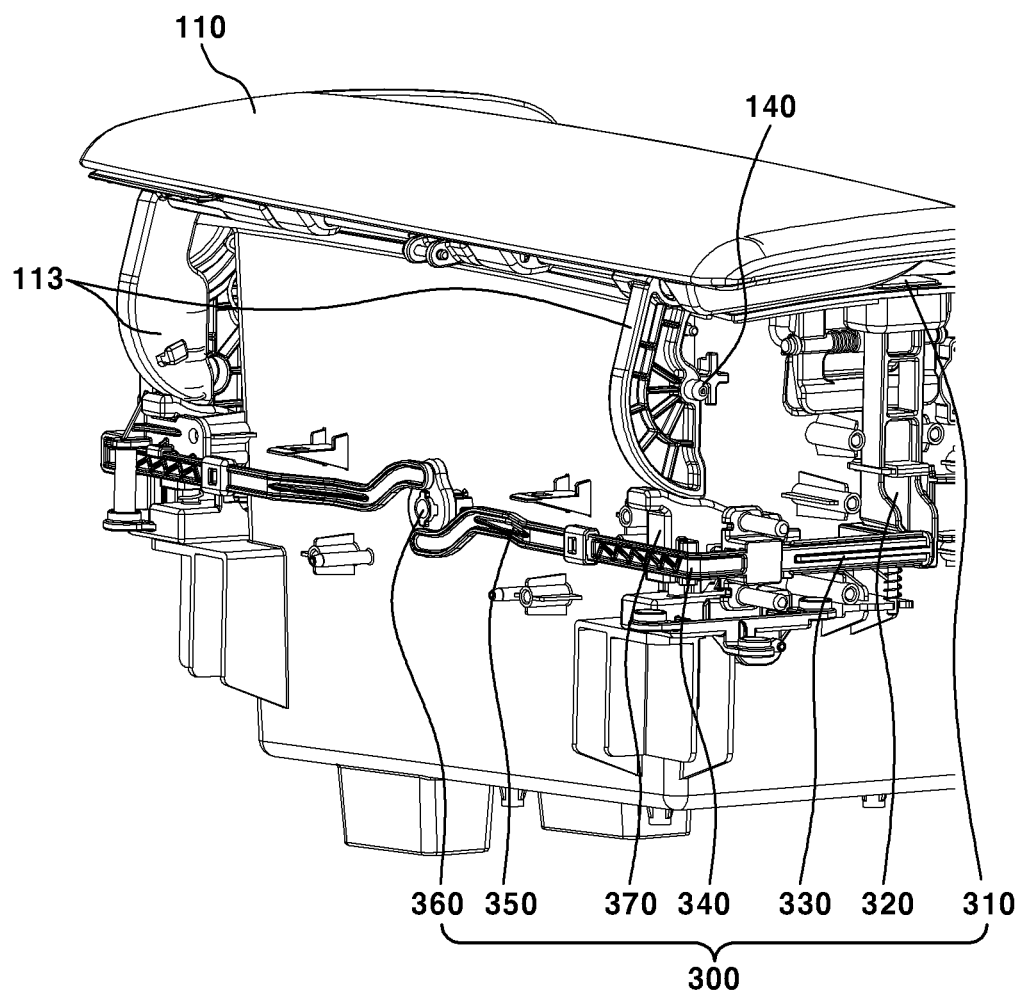
FIG. 8 is a perspective view illustrating the closure member of the apparatus for opening or closing a sliding armrest console according to the exemplary embodiment of the present invention.

FIG. 8 illustrates the coupling relationship of the closure member 300 for returning the opened armrest 110 to the closed state according to the exemplary embodiment of the present invention.

The closure member 300 may include the closure button that receives the closure request of the user, the plurality of transmission rods 320, 330, 340, and 350 that transmit the force applied to the closure button, and the closure rods 370 that move the armrest 110 in the upward direction of the console 200 by the force applied from the transmission rods 320, 330, 340, and 350.

Preferably, since the closure rods 370 are formed at both longitudinal sides of the console 200, the closure member 300 may include the rotation rod 360 for interlocking the closure rods 370.

That is, the force applied to the closure button is transmitted to the closure rods 370 formed at both sides of the console 200 through the transmission rods 320, 330, 340, and 350 and the rotation rod 360, so that the closure rods 370 move upward by the spring members 380 and the armrest 110 connected to the closure rods 370 moves upward from the console 200.

As illustrated in the drawing, the closure member 300 may include two closure rods 370 positioned at both sides of the console 200, one closure button, first to fourth transmission rods 320, 330, 340, and 350, and one rotation rod 360.

When the user presses the closure button to return the opened armrest 110 to the closed state, the first transmission rod 320 connected to the closure button moves downward and the second transmission rod 330 connected to the first transmission rod 320 slides in the direction of the third transmission rod 340 for fixing the closure rods 370.

The third transmission rod 340 allows the closure rods 370 to move upward by the sliding of the second transmission rod 330. The third transmission rod 340 moves to release the fixed states of the closure rods 370, so that the closure rods 370 move upward from the console 200 by the elastic forces of the spring members 380 positioned at the lower end portions of the closure rods 370.

Furthermore, since the third transmission rod 340 moves in the longitudinal direction of the console 200, the fourth transmission rod 350 connected to the third transmission rod 340 moves in the longitudinal direction of the console 200. The rotation rod 360 is connected to one end portion of the fourth transmission rod 350, and moves the closure rods 370 that are symmetrically positioned at both sides of the console 200.

Accordingly, when the user presses the closure button to return the opened armrest 110 to the closed state, the closure rods 370 connected to the transmission rods 320, 330, 340, and 350 move upward by the elastic forces of the spring members 380 positioned at the lower end portions of the closure rods 370, so that the armrest 110 moves upward from the console 200.

Furthermore, in the case where the armrest 110, which is maintained in the state in which it is horizontal to the external wall 210, moves upward from the console 200, a certain elastic force is applied to the armrest 110 such that the armrest 110 is rotated by the elastic member 131 positioned at the main hinge 130 in the upward direction of the console 200. Therefore, the upper portion of the console 200 is closed.

Although the above description of the closure member 300 is by way of example only in the exemplary embodiment of the present invention, the present invention may include all coupling relationships as well as a mechanical coupling relationship for upwardly moving the closure rods 370.

Figure 9:
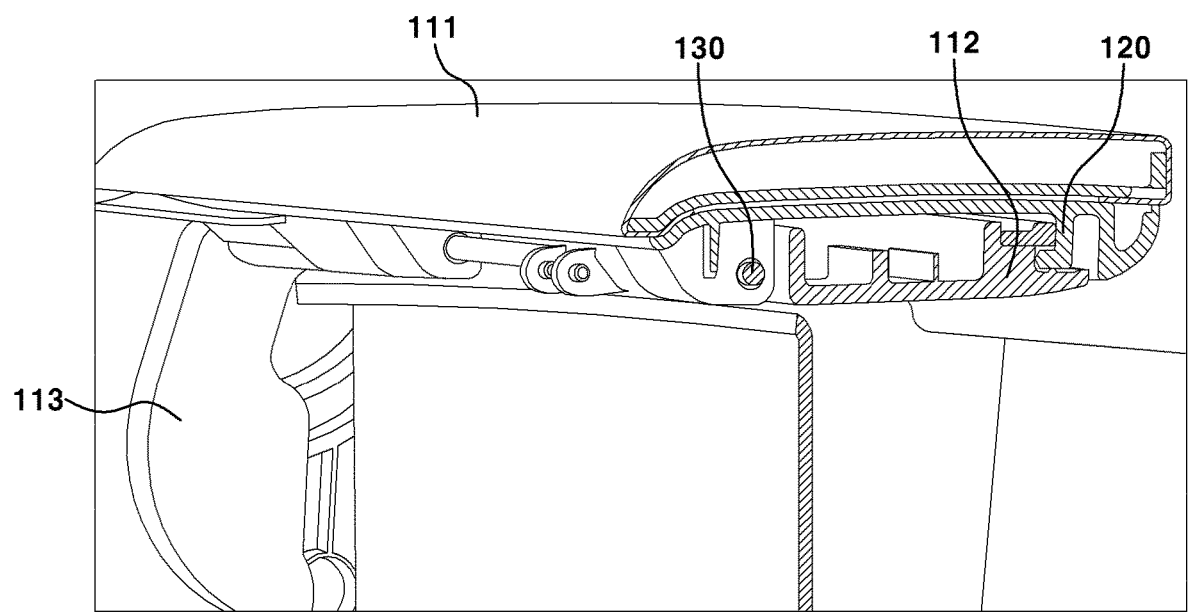
FIG. 9 is a view illustrating an enlargement structure of an upper armrest in the apparatus for opening or closing a sliding armrest console according to the exemplary embodiment of the present invention.

FIG. 9 illustrates the coupling relationship of the armrest 110 in which an upper armrest 111 slides to be enlarged longitudinally.

As illustrated in the drawing, the armrest 110 may include an upper armrest 111 and a lower armrest 112. The lower armrest 112 may include the main hinge 130, and the armrest 110 is inserted into the console 200.

Furthermore, the apparatus may further include an auxiliary sliding rail 120 which is positioned at the lower armrest 112, and the upper armrest 111 is enlarged in the longitudinal direction of the console 200 with respect to the main hinge and the auxiliary sliding rail 120.

When the upper armrest 111 slides, the main hinge 130 is configured as a main guide and the auxiliary sliding rail 120 is configured to reduce the pressure between the upper armrest 111 and the lower armrest 112.

As described above, since the upper armrest 111 is enlarged in the longitudinal direction of the console 200 in the closed state of the armrest 110, it is possible to increase the convenience of the user.

As is apparent from the above description, the present invention can obtain the following effects by the configuration, combination, and relationship of components described in exemplary embodiments.

It can be easy to access a storage space within a console even when an armrest is rotated and opened, since the armrest is rotated and inserted into the console.

It is possible to prevent an armrest from interfering with a console upper space since the armrest is inserted into a console after the console is open.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for opening and closing a sliding armrest console, the apparatus comprising:
 an armrest configured of rotating about a main hinge fixed to the armrest to be opened;
 a console, an upper portion of which is closed by the armrest;
 a first guide groove formed for guiding a movement direction of an auxiliary hinge positioned at the armrest when the armrest rotates;
 a second guide groove formed for guiding a movement direction of an auxiliary hinge; and
 a main guide groove formed in a vertical direction of the console such that the main hinge is configured to move along the main guide groove,
 wherein, when the armrest rotates about the main hinge, the auxiliary hinge moves along the first guide groove, and when the main hinge of the rotated armrest moves along the main guide groove which is formed in a vertical direction, the auxiliary hinge moves along the second guide groove, which is vertically connected to the first guide groove, so that the rotated armrest is inserted into the console.

2. The apparatus of claim 1, further including a shock absorption portion configured to regulate an insertion speed of the armrest when the armrest is inserted into and moves downwardly in the console.

3. The apparatus of claim 2, wherein the shock absorption portion includes:
 a guide rail connected to one end portion of the inserted armrest; and
 a damper positioned in contact with the guide rail,
 wherein, when the armrest is inserted into the console along the guide rail, the insertion speed of the armrest is regulated by the damper.

4. The apparatus of claim 1, further including a closure member positioned in contact with one end portion of the inserted armrest when the armrest is opened and inserted into the console.

5. The apparatus of claim 4, wherein the closure member includes:
 a closure button positioned at an upper end portion of the console;
 a closure rod moving to compress a spring member thereof when the armrest is inserted into the console; and
 a plurality of transmission rods configured to transmit a force applied to the closure button to the closure rod.

6. The apparatus of claim 4, wherein
 the closure member includes closure members positioned at first and second longitudinal end portions of the console; and
 the closure members are interlocked with each other by a rotation rod connected thereto.

7. The apparatus of claim 1, wherein
 the armrest includes an upper armrest and a lower armrest,
 wherein the upper armrest is enlarged longitudinally through the main hinge and an auxiliary sliding rail positioned at the lower armrest.

8. The apparatus of claim 1, wherein the main guide groove and the second guide groove allow the armrest to be inserted into the console in an opened state.

9. The apparatus of claim 1, wherein the main guide groove and the first and second guide grooves are formed over first and second longitudinal end portions of the console.

10. The apparatus of claim 1, wherein the main guide groove and the first and second guide grooves are formed in a guide cover internally disposed within the console.

11. The apparatus of claim 1, further including an elastic member positioned at the main hinge,
 wherein the elastic member is contracted when the armrest rotates.

12. The apparatus of claim 1, wherein the armrest includes double armrests.

* * * * *